Aug. 23, 1938.        W. A. BRECHT        2,128,072
RAILWAY LOCOMOTIVE
Filed Nov. 13, 1935
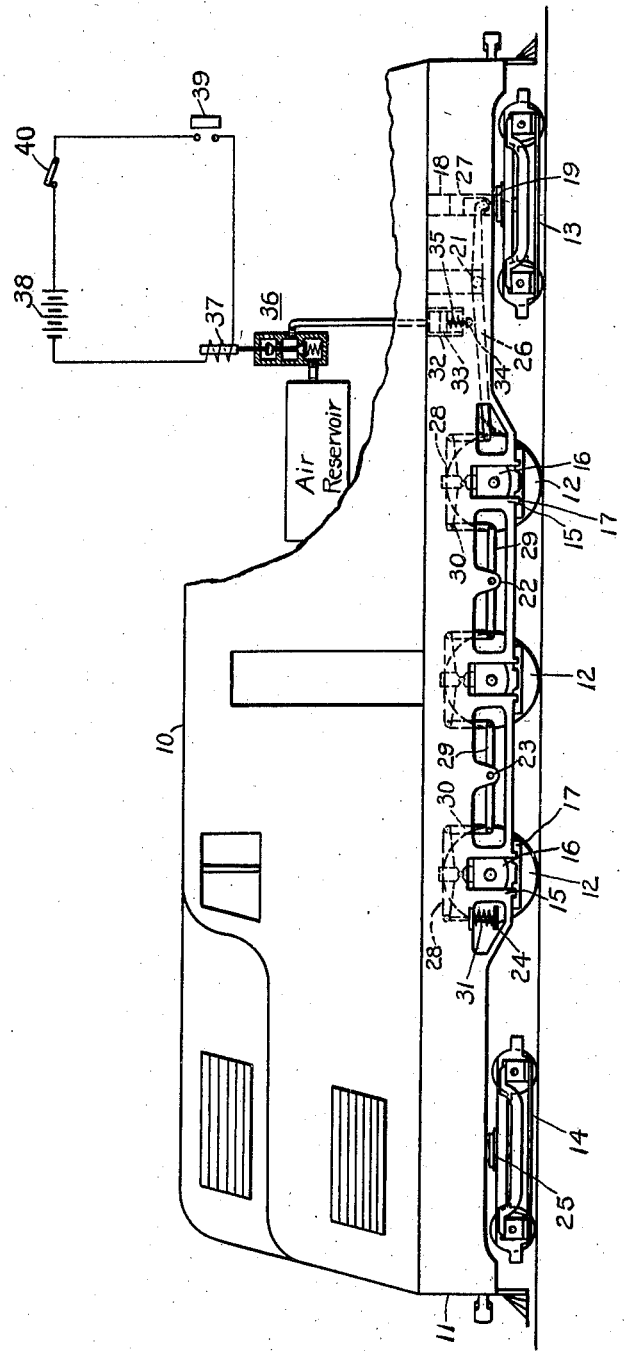
WITNESSES:
C. N. Evans
INVENTOR
Winston A. Brecht.
BY
ATTORNEY Patented Aug. 23, 1938

2,128,072

UNITED STATES PATENT OFFICE 2,128,072

RAILWAY LOCOMOTIVE

Winston A. Brecht, Pittsburgh, Pa., assignor to Westinghouse Electric & Manufacturing Company, East Pittsburgh, Pa., a corporation of Pennsylvania Application November 13, 1935, Serial No. 49,511

5 Claims. (Cl. 105—75)

My invention relates to railway locomotives and more specifically to the structure of electric locomotives.

When operating electric locomotives, particularly those designed for high speed freight service, or passenger locomotives which are being utilized for freight service, it is frequently desirable to be able to transfer weight from the guiding trucks to the driving wheels during starting in order to develop a greater starting tractive effort. As the speed increases the weight must be transferred back to the guiding trucks in order to obtain the proper guiding characteristics at high speeds.

An object of my invention, generally stated, is to provide an electric locomotive which shall be simple and efficient in operation and which may be economically manufactured and installed.

A more specific object of my invention is to provide for increasing the tractive effort of an electric locomotive during starting.

Another object of my invention is to provide for transferring weight from the guiding trucks to the driving wheels of a locomotive through an equalizing system.

Other objects of my invention will be explained fully hereinafter or will be apparent to those skilled in the art.

The copending application of F. L. Alben, Serial No. 49,510, filed Nov. 13, 1935, describes and claims a system for transferring weight from the guiding trucks to the driving wheels of an electric locomotive of the truck type wherein the locomotive cab is not rigidly connected to the main frame of the locomotive. The present application relates to locomotives wherein the cab is rigidly connected to the locomotive frame and one or more of the guiding trucks is connected to the driver system through equalizers.

In accordance with the present invention, air cylinders, each one of which contains a piston, are attached to the locomotive frame. By admitting air to the cylinders under pressure, the pistons are forced against the truck equalizer bars in such a manner that a part of the weight normally carried by the guiding trucks is transferred to the driving wheels, thereby increasing their traction on the rails. The admission of air pressure to the cylinders may be controlled by standard magnet valves, or other suitable means, and the operation of the valves may be so coordinated with the locomotive control system that the pistons are operated only during the starting of the locomotive.

For a fuller understanding of the nature and objects of the invention, reference may be had to the following detailed description, taken in conjunction with the accompanying drawing, in which the single figure is a view, in side elevation, of an electric locomotive embodying my invention, a portion of the locomotive cab being broken away.

Referring now to the drawing, the locomotive comprises a cab or body portion 10 that is rigidly connected to a frame or bed 11. The locomotive shown is provided with three pairs of driving wheels 12 and two guiding trucks 13 and 14, one truck being at each end of the locomotive. However, it will be understood that the weight-transfer device herein described is not limited to locomotives of the particular type illustrated. The frame 11 is provided with the usual pedestals 15, adapted to receive journal boxes 16 in which the driving wheel axles are rotatably mounted. The journal boxes 16 are held in the pedestals 15 by cross strips 17 secured to the bottom of the frame 11. The driving wheels may be propelled by electric motors (not shown) in any suitable manner.

The weight of the locomotive cab 10 and frame 11 is carried on a side spring equalization system at points 21, 22, 23, 24 and a center pin 25 of the truck 14. In the system illustrated, the guiding truck 13 is equalized to the drivers while the truck 14 is independent of the drivers. Since the equalizing mechanism shown is duplicated on the other side of the locomotive, the complete equalizing system provides one resultant suspension point at each side of the locomotive, with truck 14 forming the third point of a three point suspension.

As shown, the equalizing mechanism for one side of the locomotive comprises a truck equalizer arm 26, one end of which rests in a cross head 27 that is disposed in an opening 18 in the locomotive frame and rests on the center pin 19 of the truck 13; springs 28, one of which is mounted on top of each of the journal boxes 16, and equalizer arms 29 which are connected to the springs 28 by hanger straps 30. One end of the equalizing system is anchored to the frame 11 at the point 24 through a spring 31. As stated hereinbefore, the equalizing mechanism shown is duplicated on the other side of the locomotive.

The normal division of load between the guiding trucks 13 and 14 and the drivers 12 depends upon the longitudinal location of the fulcrum 21 for the truck equalizer bar 26. By shifting the fulcrum toward the drivers, load is taken from each of the trucks and added to the drivers.

The present invention provides a means whereby the operator of a locomotive can cause weight to be transferred from the guiding trucks to the driving wheels and back again when desired. In this manner the tractive effort of the driving wheels may be increased for starting the locomotive, thereby taking advantage of the short time overload capacity of the propelling motors.

A cylinder 32 is secured to the frame 11 above the equalizer bar 26 on one side of the locomotive and a similar cylinder (not shown) is provided above the equalizer bar on the opposite side of the locomotive. A piston 33 is disposed inside of the cylinder 32 to force a plunger 34 against the equalizer bar 26 when air, or other fluid pressure, is applied to the piston. A spring 35 raises the piston 33 when the air is released from the cylinder.

The pressure applied on the bar 26 creates a moment about the fulcrum 21 which increases the force on the driver equalizers, thereby increasing the load on the driving wheels at the rail and decreasing the load on the guiding trucks. In this manner weight may be temporarily transferred from the guiding trucks to the driving wheels, the effect being the same as would be accomplished by moving the fulcrum point 21 for the lever 26 toward the driving wheels.

The normal action of the equalization system is not interfered with while air pressure is applied to the piston 33 to force the plunger 34 against the bar 26, as the trapped air in the cylinder 32 may be compressed sufficiently to afford ample flexibility for rotational motions of the equalizer bar 26 about the fulcrum 21 caused by irregularities in the track.

In order that the operation of the weight transfer device may be coordinated with the control system for the locomotive, an electrically operated fluid valve 36 is provided for controlling the operation of the piston 33. The actuating coil 37 of the fluid valve 36 may be energized from a battery 38 through a circuit established by the closing of the switch 39, which may be a contact segment on the master controller for the locomotive.

The contact segment 39 may be so located on the controller that the weight transfer device will function only during the starting of the locomotive, thereby insuring that normal weight will be restored on the guiding trucks after the locomotive is started and attains speed. An additional switch 40 may be provided to prevent the operation of the weight-transfer device in case it is not required or desired. Another fluid valve (not shown), similar to the valve 36, may be provided for controlling the operation of the piston on the other side of the locomotive and the electrical circuits may be so connected that the two pistons will be operated simultaneously.

From the foregoing description, it is apparent that I have provided a simple and effective means for transferring weight from the guiding trucks to the driving wheels, of a locomotive having a weight equalizing system, to increase the starting tractive effort of the locomotive. By utilizing the weight-transfer device herein described, it is perfectly feasible to add as much as 20% or 25% to the load on the driving wheels during starting of a locomotive. Furthermore, it is evident that the application of the present weight-transfer device is not limited to the particular locomotive wheel and equalization arrangement herein shown.

Since many modifications may be made in the apparatus and arrangement of parts without departing from the spirit of my invention, I do not wish to be limited other than by the scope of the appended claims.

I claim as my invention:

1. In a railway locomotive, in combination, a plurality of driving wheels, an equalizing system for distributing the weight carried by the driving wheels, a guiding truck at each end of the locomotive, a center pin on each one of said trucks, equalizing bars disposed at each side of the locomotive and connected between only one of said guiding trucks and said equalizing system for distributing the locomotive weight between the driving wheels and the guiding trucks, said equalizing bars having fulcrum points fixed in the locomotive frame and one end resting on the center pin of one of said trucks, the locomotive frame being disposed directly on the center pin of the other truck and means cooperating with the equalizing bars to create a moment about their fulcrum points for temporarily transferring weight between the guiding trucks and the driving wheels while the locomotive is in operation.

2. In a railway locomotive, in combination, a plurality of driving wheels, an equalizing system for distributing the weight carried by the driving wheels, a guiding truck disposed at each end of the locomotive, a center pin on each one of said trucks, only one of said guiding trucks being connected to the equalizing system for the driving wheels by a pair of equalizing bars, said equalizing bars having fulcrum points fixed in the locomotive frame and one end resting on the center pin of one of said trucks, and means cooperating with said equalizing bars to create a moment about their fulcrum points for transferring weight from both of said guiding trucks to the driving wheels.

3. In a railway locomotive, in combination, a plurality of driving wheels, an equalizing system for distributing the weight carried by the driving wheels, a guiding truck at each end of the locomotive, a center pin on each one of said trucks, only one of said trucks being connected to the equalizing system by an equalizing bar disposed between said truck and the driving wheels and pivotally connected to the locomotive frame at a fixed fulcrum point to distribute the locomotive weight between the driving wheels and the guiding trucks, said equalizing bar having one end connected to the equalizing system for the driving wheels and the other end resting on the center pin of one of said guiding trucks, and means for applying pressure on said equalizing bar to create a moment about its fulcrum point, thereby transferring weight from the guiding trucks to the driving wheels.

4. In a railway locomotive, in combination, a plurality of driving wheels, an equalizing system for distributing the weight carried by the driving wheels, a guiding truck at each end of the locomotive, a center pin on each one of said trucks, only one of said trucks being connected to the equalizing system by an equalizing bar disposed between said truck and the driving wheels and pivotally connected to the locomotive frame at a fixed fulcrum point to distribute the locomotive weight between the driving wheels and the guiding trucks, said equalizing bar having one end connected to the equalizing system for the driving wheels and the other end resting on the center pin of one of said guiding trucks, the locomotive frame being disposed directly on the center pin of the other truck, and fluid pressure operated means for applying pressure on said equalizing bar to create a moment about its fulcrum point, thereby transferring weight from the guiding trucks to the driving wheels.

5. In a railway locomotive having an electrical control system for controlling its operation, in combination, a plurality of driving wheels, an equalizing system for distributing the weight carried by the driving wheels, a guiding truck at each end of the locomotive, a center pin on each one of said trucks, only one of said trucks being connected to the equalizing system by an equalizing bar disposed between said truck and the driving wheels and pivotally connected to the locomotive frame at a fixed fulcrum point to distribute the locomotive weight between the driving wheels and the guiding trucks, said equalizing bar having one end connected to the equalizing system for the driving wheels and the other end resting on the center pin of one of said guiding trucks, fluid pressure operated means for applying pressure on said equalizing bar to create a moment about its fulcrum point, and means associated with said electrical control system for the locomotive for controlling the operation of the pressure applying means to transfer weight from the guiding trucks to the driving wheels during starting of the locomotive.

WINSTON A. BRECHT.